(12) United States Patent
Oh et al.

(10) Patent No.: US 12,166,407 B2
(45) Date of Patent: Dec. 10, 2024

(54) ROTOR WITH COOLING END RINGS AND ELECTRIC MOTOR INCLUDING SAME

(71) Applicant: LG Magna e-Powertrain Co., Ltd., Incheon (KR)

(72) Inventors: Jinsu Oh, Seoul (KR); Jiwon Lee, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 614 days.

(21) Appl. No.: 17/411,358

(22) Filed: Aug. 25, 2021

(65) Prior Publication Data
US 2021/0384801 A1    Dec. 9, 2021

Related U.S. Application Data

(63) Continuation of application No. PCT/KR2019/002266, filed on Feb. 25, 2019.

(51) Int. Cl.
*H02K 9/193* (2006.01)
*H02K 1/2706* (2022.01)
(Continued)

(52) U.S. Cl.
CPC ........... *H02K 9/193* (2013.01); *H02K 1/2706* (2013.01); *H02K 5/18* (2013.01); *H02K 5/207* (2021.01); *H02K 9/19* (2013.01); *H02K 2205/09* (2013.01)

(58) Field of Classification Search
CPC ...... H02K 9/193; H02K 5/207; H02K 1/2706; H02K 5/18; H02K 2205/09
See application file for complete search history.

(56) References Cited

U.S. PATENT DOCUMENTS

| | | | |
|---|---|---|---|
| 9,847,682 B2 | 12/2017 | Takahashi | |
| 2013/0221772 A1* | 8/2013 | Miyamoto | H02K 9/19 310/54 |

(Continued)

FOREIGN PATENT DOCUMENTS

| | | |
|---|---|---|
| CN | 201355790 | 12/2009 |
| CN | 103081312 | 5/2013 |

(Continued)

OTHER PUBLICATIONS

Kaneko (JP 2002345188 A) English Translation (Year: 2002).*

(Continued)

*Primary Examiner* — Tulsidas C Patel
*Assistant Examiner* — Robert E Mates
(74) *Attorney, Agent, or Firm* — Fish & Richardson P.C.

(57) ABSTRACT

An electric motor includes a rotor including a rotary shaft defining a first fluid channel configured to carry a cooling fluid, a rotor core including a plurality of permanent magnets and defining a second fluid channel in communication with the first fluid channel, and end rings mounted on opposite end portions of the rotor core. Each end ring includes injection holes in fluid communication with the second fluid channel and configured to inject the cooling fluid. Each end ring includes a plurality of rotary pins that are circumferentially arranged on an outer surface of the end ring, that are spaced apart from one another, and that are configured to circulate the cooling fluid injected through the plurality of injection holes into the first fluid channel.

14 Claims, 11 Drawing Sheets

(51) Int. Cl.
*H02K 5/18* (2006.01)
*H02K 5/20* (2006.01)
*H02K 9/19* (2006.01)

(56) References Cited

U.S. PATENT DOCUMENTS

| | | | |
|---|---|---|---|
| 2013/0334912 A1* | 12/2013 | Tokunaga | H02K 9/19 |
| | | | 310/54 |
| 2015/0137632 A1 | 5/2015 | Takahashi | |
| 2019/0006913 A1 | 1/2019 | Stieger | |
| 2019/0013717 A1 | 1/2019 | Li et al. | |
| 2019/0027987 A1 | 1/2019 | Fröhlich et al. | |

FOREIGN PATENT DOCUMENTS

| | | |
|---|---|---|
| CN | 103296808 | 9/2013 |
| CN | 103746485 | 4/2014 |
| CN | 101313453 | 11/2018 |
| DE | 102016200081 | 7/2017 |
| JP | 2002345188 | 11/2002 |
| JP | 2002345188 A * | 11/2002 |
| JP | 2010063253 | 3/2010 |
| JP | 2010239799 | 10/2010 |
| JP | 2011254571 | 12/2011 |
| JP | 2012182952 | 9/2012 |
| JP | 2013-115848 | 6/2013 |
| JP | 2014-183602 | 9/2014 |
| JP | 2014183602 A * | 9/2014 |
| JP | 2014187834 | 10/2014 |
| WO | WO 2009060758 | 5/2009 |
| WO | WO2017072874 | 5/2017 |
| WO | WO 2018225877 | 12/2018 |

OTHER PUBLICATIONS

Morishita (JP 2014183602 A) English Translation (Year: 2014).*
Notice of Allowance in Chinese Appln. No. 201980093032.1, mailed on Nov. 1, 2023, 14 pages (with English translation).
Extended European Search Report in European Appln. No. 19917172.9, Sep. 21, 2022, 10 pages.
Office Action in Chinese Appln. No. 201980093032.1, mailed on Jun. 5, 2023, 34 pages (with English translation).

* cited by examiner

→ : OIL FLOW PATH

ROTOR WITH COOLING END RINGS AND ELECTRIC MOTOR INCLUDING SAME

CROSS-REFERENCE TO RELATED APPLICATIONS

Pursuant to 35 U.S.C. § 119(e), this application is a continuation of International Application PCT/KR2019/002266, with an international filing date of Feb. 25, 2019, the contents of which are hereby incorporated by reference herein in their entirety.

TECHNICAL FIELD

The present disclosure relates to an electric motor that directly cools a shaft and a rotor using oil circulation.

BACKGROUND

An electric vehicle may include an electric motor as a driving source for traveling the vehicle without exhaust gas.

An electric motor (or motor) may include a rotor and a stator, and the rotor may be rotatably provided inside the stator.

The stator may include a stator coil wound around a stator core. When current flows along the stator coil to rotate the rotor, heat may be generated in the stator coil.

As for the electric motor used in the electric vehicle, cooling of heat generated in the electric motor may play an important role in achieving a smaller and more efficient electric motor.

Motor cooling methods may include an indirect cooling method (water cooling) in which a channel for circulating cooling water is provided in a housing to indirectly cool a motor, and a direct cooling method (oil cooling) in which oil is sprayed onto a stator coil and the like to directly cool a motor.

In some cases, the direct cooling method may have a high cooling efficiency and cooling performance, compared to the indirect cooling method using the cooling water.

In some examples, a fluid channel through which oil flows may be provided in a shaft and a rotor core. As the oil flows along the fluid channel, the rotor core and permanent magnets may be cooled.

FIG. 1 is a conceptual view illustrating a movement path of oil in an electric motor of the related art.

For example, an oil channel 6 passing from a rotor core 3 to magnets 4 may be formed in the rotor core 3 axially in both directions of a shaft 2, so that oil may be sprayed in the both directions through end plates 5 mounted on both ends of the rotor core 3.

The oil may be diverged and sprayed from the rotor core 3 axially in the both directions opposite to each other.

For example, a circulation flow rate at which the oil flows along the oil channel 6 may be slowed, and thereby the cooling performance of the oil may be deteriorated.

In some cases, after the oil introduced through an oil inlet of the shaft 2 is filled in the oil channel 6 inside the rotor core 3 by centrifugal force, when the oil is sprayed in the both directions through center holes 7 formed through the both end plates 5, respectively, the oil may be stagnated in the oil channel 6 formed between the two end plates 5.

SUMMARY

The present disclosure describes an electric motor that can increase a circulation flow rate of oil and improve cooling performance of a shaft and a rotor by using oil circulation.

The present disclosure also describes an electric motor that can increase a circulation flow rate of oil flowing along a fluid channel defined inside a shaft and a rotor core by fast rotating air around end plates to lower pressure of the air.

According to one aspect of the subject matter described in this application, a rotor includes a rotary shaft defining a first fluid channel configured to guide a cooling fluid, a rotor core that is configured to rotate about the rotary shaft, that includes a plurality of permanent magnets, and that defines a plurality of second fluid channels that are in fluid communication with the first fluid channel and configured to cool the plurality of permanent magnets by the cooling fluid, and a plurality of end rings that are respectively disposed at end portions of the rotor core and that define a plurality of spray holes that are in fluid communication with the plurality of second fluid channels and configured to spray the cooling fluid to an outside of the rotor core. Each end ring among the plurality of end rings includes a plurality of rotary fins that are disposed on an outer surface of the end ring and spaced apart from one another in a circumferential direction, where the plurality of rotary fins are configured to circulate, to the first fluid channel, the cooling fluid sprayed through the plurality of spray holes.

Implementations according to this aspect can include one or more of the following features. For example, each fin of the plurality of rotary fins can protrude from the outer surface of the end ring in an axial direction of the rotary shaft and has a curved shape that is curved from an inner end portion of the end ring to an outer end portion of the end ring in a radial direction, where the plurality of rotary fins are configured to cause air to rotate around the end ring. In some examples, the plurality of end rings can include a first end ring disposed at a first end portion of the rotor core and a second end ring disposed at a second end portion of the rotor core, where the second end portion is spaced apart from the first end portion in an axial direction of the rotary shaft. The first end ring and the second end ring can be asymmetric with each other.

In some implementations, the first end ring can include a plurality of first rotary fins, and the second end ring can include a plurality of second rotary fins, where the plurality of first rotary fins and the plurality of second rotary fins are curved in a rotating direction of the rotor core. In some examples, each of the first end ring and the second end ring can define (i) a plurality of injection fluid channels that are disposed at an inner surface of one of the first end ring and the second end ring, the inner surface facing an end of the rotor core, where the plurality of injection fluid channels are spaced apart from one another in the circumferential direction and in fluid communication with the plurality of spray holes, and (ii) a plurality of return fluid channels that are arranged alternately with the plurality of injection fluid channels in the circumferential direction, where the plurality of return fluid channels are configured to transfer the cooling fluid from the rotor core toward another end of the rotor core in the axial direction.

In some examples, the rotor core can further define a plurality of axial fluid channels that extend from a radially inner end portion of the rotor core, where the plurality of axial fluid channels are connected to and in fluid communication with the first fluid channel, and each of the plurality of return fluid channels can include a connection fluid channel that is connected to and in fluid communication with one of the plurality of axial fluid channels.

In some implementations, the cooling fluid can be oil.

In some implementations, each of the plurality of spray holes can be inclined with respect to an axial direction of the rotary shaft and extends toward an outside of one of the plurality of end rings. In some examples, each of the plurality of injection fluid channels of the first end ring can face one of the plurality of return fluid channels of the second end ring in the axial direction. In some examples, the rotor core and the plurality of permanent magnets can be configured to be cooled by the cooling fluid moving from the first fluid channel to the plurality of second fluid channels. The plurality of spray holes can be configured to spray the cooling fluid to a stator coil disposed outside the rotor core to thereby cool the stator coil.

In some examples, the rotor can include a plurality of paths configured to transfer the cooling fluid from the rotary shaft to the rotor core, where a number of the plurality of paths is equal to a number of poles of the plurality of permanent magnets. The rotary shaft can further define a plurality of communication holes that are connected to the rotor core, that are defined at a middle portion of the rotary shaft, and that extend in a radial direction of the rotary shaft.

In some examples, the rotor can further include a plurality of paths configured to transfer the cooling fluid from the rotary shaft to the rotor core, where a number of the plurality of paths is a half of a number of poles of the plurality of permanent magnets. The rotary shaft can further define a plurality of communication holes that are connected to the rotor core, that are defined through a first end portion and a second end portion of the rotary shaft, and that extend in a radial direction of the rotary shaft.

In some examples, the plurality of communication holes can include a plurality of first communication holes defined through the first end portion of the rotary shaft, and a plurality of second communication holes defined through the second end portion of the rotary shaft, where each of the plurality of first communication holes is spaced apart from one of the plurality of second communication holes in the circumferential direction by a preset angle.

According to another aspect, an electric motor includes a housing, a stator that is disposed in the housing and includes a stator core and a stator coil wound around the stator core, a rotor including a rotary shaft, a rotor core disposed in the stator and configured to rotate about the rotary shaft, and a plurality of permanent magnets disposed at the rotor core, and a plurality of end rings respectively disposed at ends of the rotor core. The housing defines a plurality of spray nozzles therein that are configured to spray a cooling fluid to the stator coil and the stator core. The rotor defines a first fluid channel inside the rotary shaft, a plurality of second fluid channels inside the rotor core, where the plurality of second fluid channel are in contact with the plurality of permanent magnets, and a plurality of spray holes that are connected to and in fluid communication with the plurality of second fluid channels, where the plurality of spray holes extend obliquely through an outer circumferential portion of one of the plurality of end rings and are configured to spray the cooling fluid to an end portion of the stator coil. The first fluid channel, the plurality of second fluid channels, and the plurality of spray holes define a single-pass structure configured to guide the cooling fluid in a single direction.

Implementations according to this aspect can include one or more of the following features. For example, each end ring among the plurality of end rings can include a plurality of rotary fins that protrude from an outer surface of the end ring and that have a curved shape, where the plurality of rotary fins are configured to circulate, to the first fluid channel, the cooling fluid sprayed from the plurality of spray nozzles and the plurality of spray holes. In some examples, the plurality of end rings can include a first end ring and a second end ring that are spaced apart from each other in the single direction. In some examples, the plurality of second fluid channels are spaced apart from one another and extend parallel to the single direction.

In some implementations, the rotary shaft can further define a plurality of communication holes that are connected to the rotor core and extend in a radial direction of the rotary shaft. In some examples, the plurality of communication holes can include a plurality of first communication holes defined at a first end portion of the rotary shaft, and a plurality of second communication holes defined at a second end portion of the rotary shaft, where each of the plurality of first communication holes is spaced apart from one of the plurality of second communication holes in a circumferential direction of the rotary shaft by a preset angle.

In some implementations, the electric motor can include a plurality of first pipes that extend from the plurality of first communication holes to the rotor core, and a plurality of second pipes that extend from the plurality of second communication holes to the rotor core, where a length of each of the plurality of first pipes is different from a length of each of the plurality of second pipes.

In some implementations, a plurality of rotary fins can protrude from an outer surface of each end ring in a curved shape along a circumferential direction. As the plurality of rotary fins rotate together with a rotor core, air around spray holes of the end ring can flow rapidly, which can cause a pressure drop. Accordingly, a cooling fluid can flow from a first fluid channel of a rotary shaft into axial fluid channels and second fluid channels of the rotor core so as to be sprayed onto an inner circumferential surface of an end turn of a stator through a plurality of spray holes.

In some implementations, the plurality of rotary fins can provide circulating power to the cooling fluid, so that the cooling fluid can move from the first fluid channel of the rotary shaft into the axial fluid channels and second fluid channels of the rotor core and easily circulate back to the first fluid channel of the rotary shaft through spray holes of the end ring, thereby increasing a circulation flow rate of the cooling fluid.

In some implementations, since a rotation speed of the plurality of rotary fins increases according to the rotation of the rotor core, a flow rate of the cooling fluid introduced into the rotary shaft can increase.

In some implementations, since the plurality of rotary fins are disposed on each of a first end ring and a second end ring to be curved in the same direction as a rotating direction of the rotor core, circulating power of the cooling fluid can further be doubled.

In some implementations, as paths along which the cooling fluid is transferred from the rotary shaft to the rotor core are independently defined in the same number as the number of poles, the cooling fluid can flow along each of a plurality of permanent magnets so as to uniformly cool down the permanent magnets for each polarity.

In some implementations, a plurality of injection fluid channels and a plurality of return fluid channels can be alternately disposed in an inner surface of the end ring in a spaced manner along a circumferential direction, and the cooling fluid in the rotor core can move in the same single direction along the axial fluid channels and the second fluid channels so as to implement a single-pass structure. Accordingly, a flow rate and a circulation flow rate of the cooling fluid can increase, thereby improving cooling performance of the rotor and the stator.

DETAILED DESCRIPTION

Description will now be given in detail according to exemplary implementations disclosed herein, with reference to the accompanying drawings. For the sake of brief description with reference to the drawings, the same or equivalent components can be provided with the same or similar reference numbers, and description thereof will not be repeated.

Figure 1:
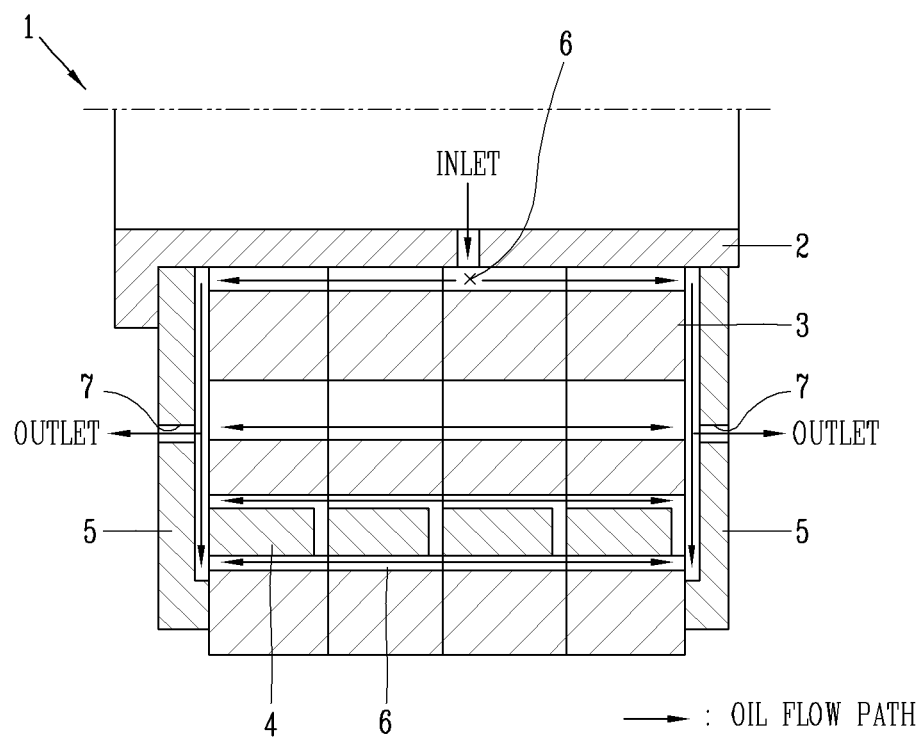
FIG. 1 is a conceptual view illustrating a movement path of oil in an electric motor of related art.
Figure 2:
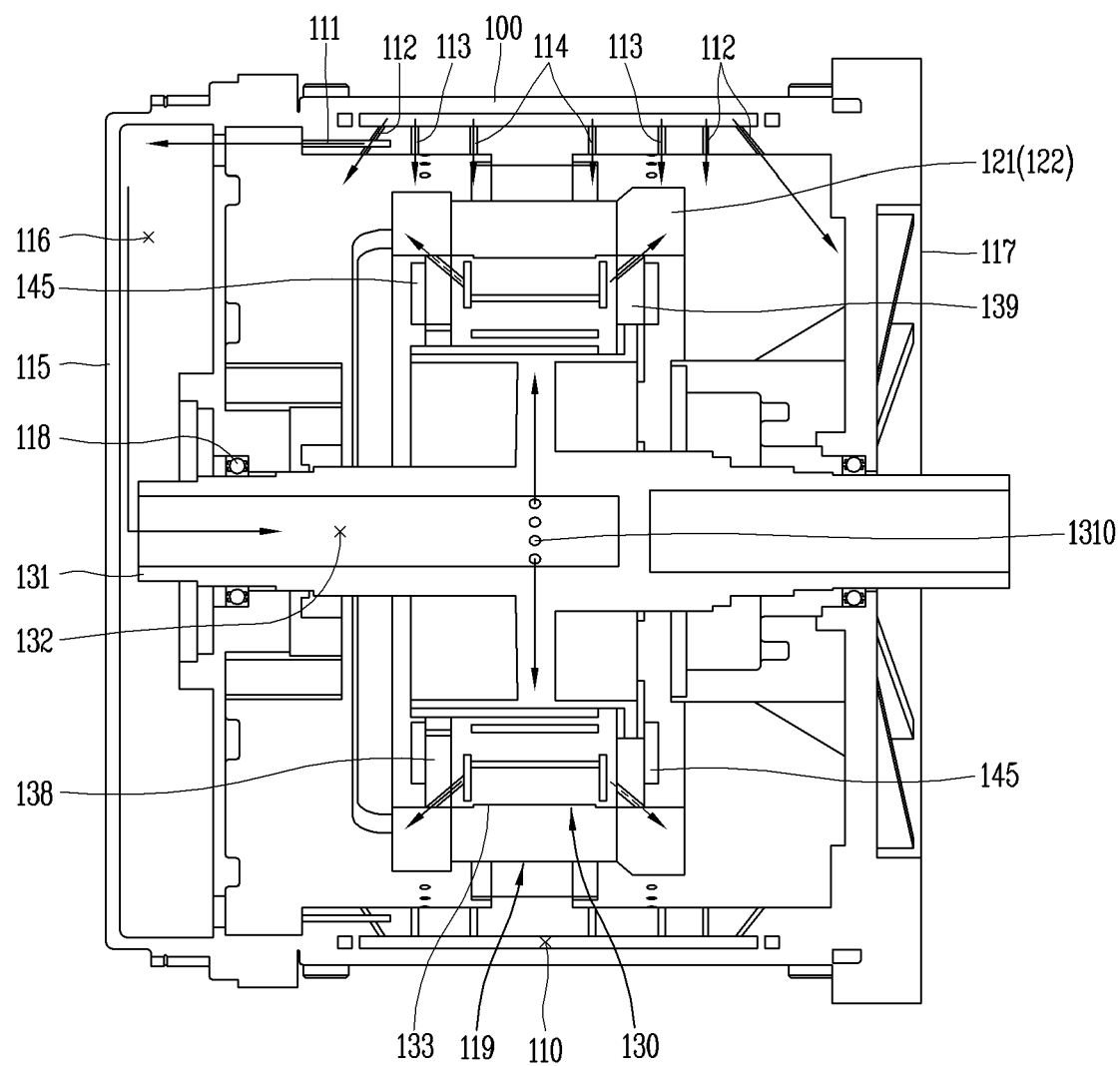
FIG. 2 is a cross-sectional view illustrating an internal structure of an example electric motor.
Figure 3:
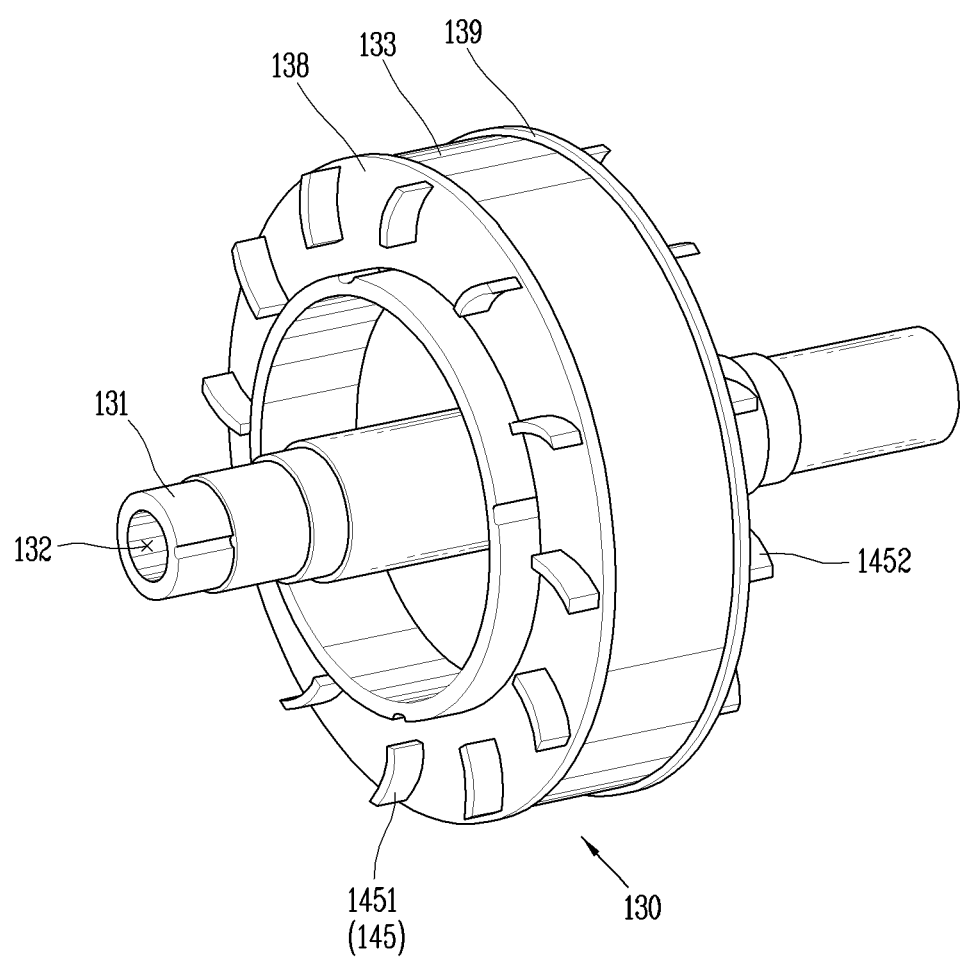
FIG. 3 is a conceptual view illustrating an example rotor of FIG. 2.
Figure 4:
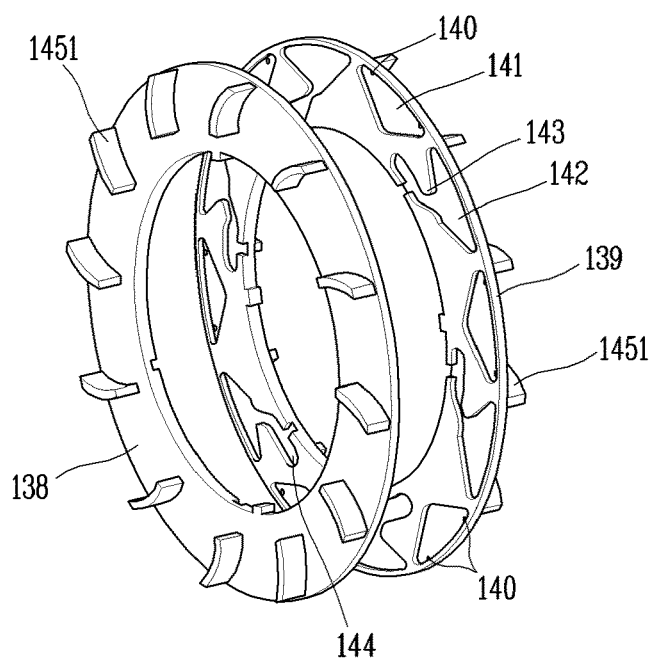
FIG. 4 is a conceptual view illustrating example end rings mounted to both ends of a rotor core in FIG. 3.
Figure 5:
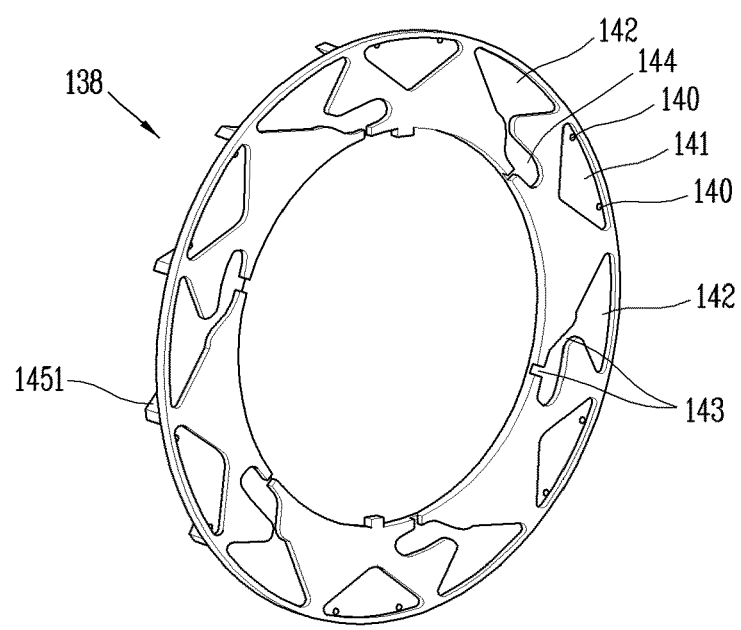
FIG. 5 is a conceptual view illustrating an example structure including a plurality of injection fluid channels and a plurality of return fluid channels that are alternately defined through each end ring in FIG. 4.
Figure 6:
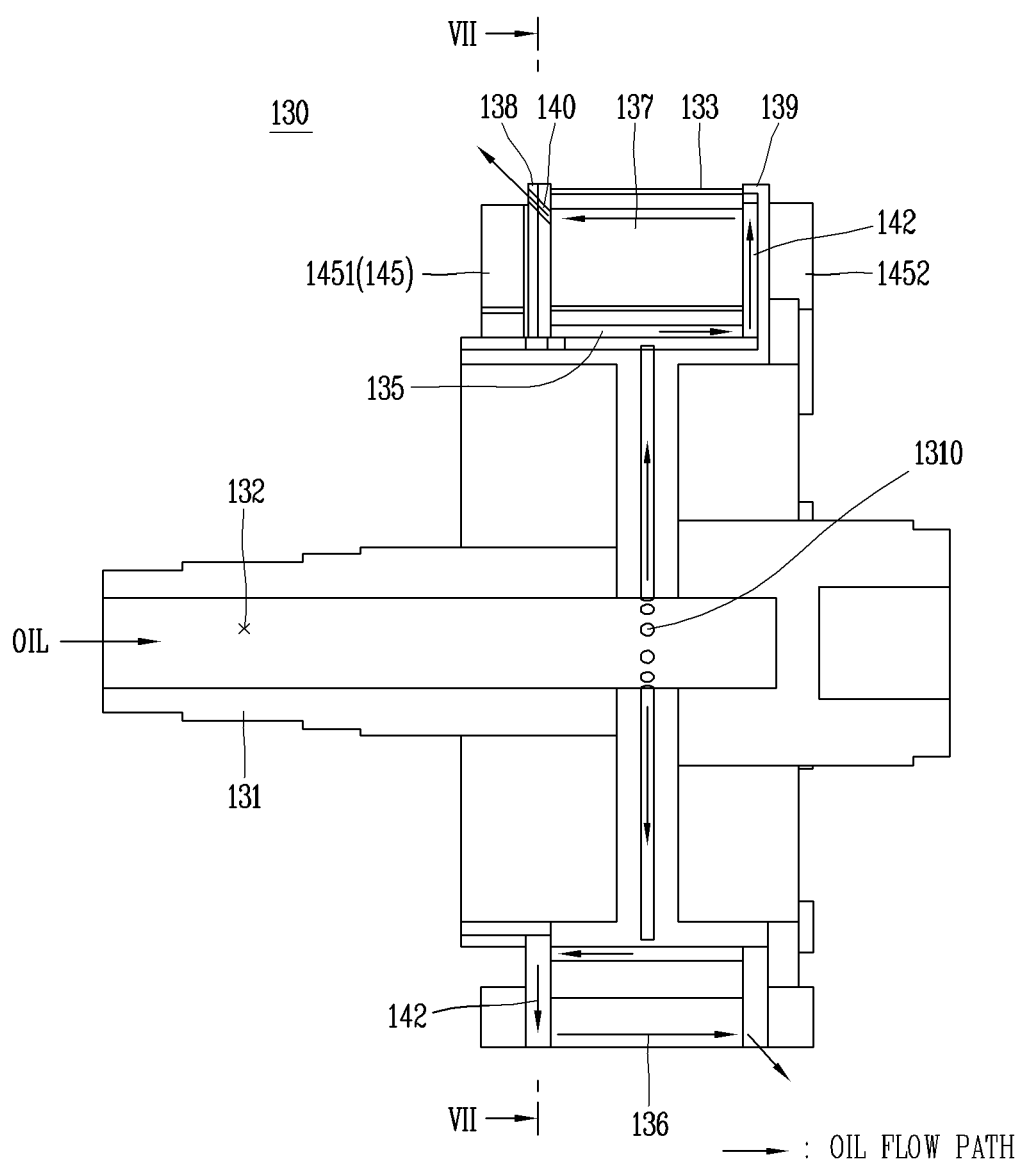
FIG. 6 is a cross-sectional view taken along the line VI-VI of FIG. 3.
Figure 7:
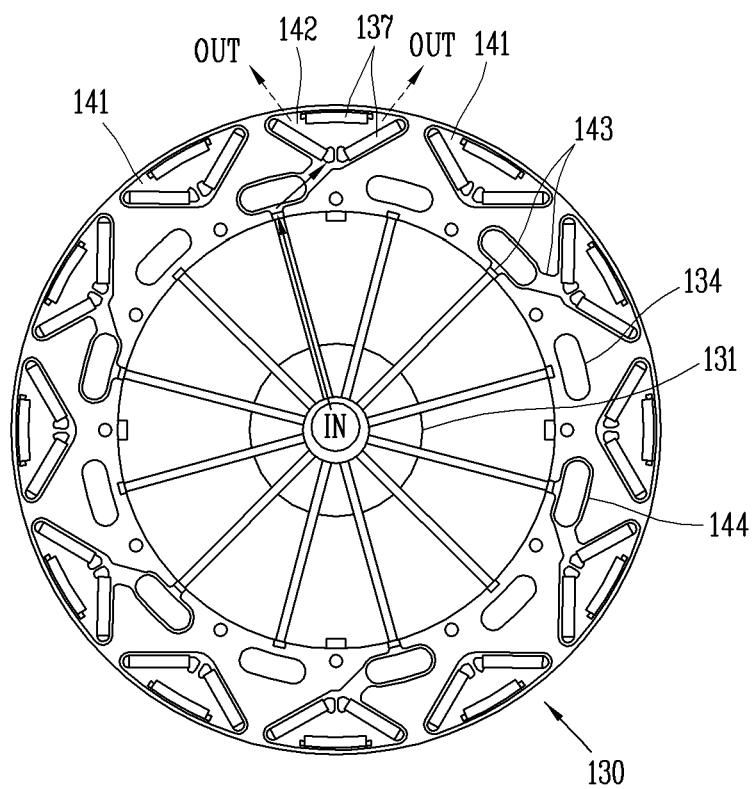
FIG. 7 is a cross-sectional view taken along the line VII-VII of FIG. 6.
Figure 8:
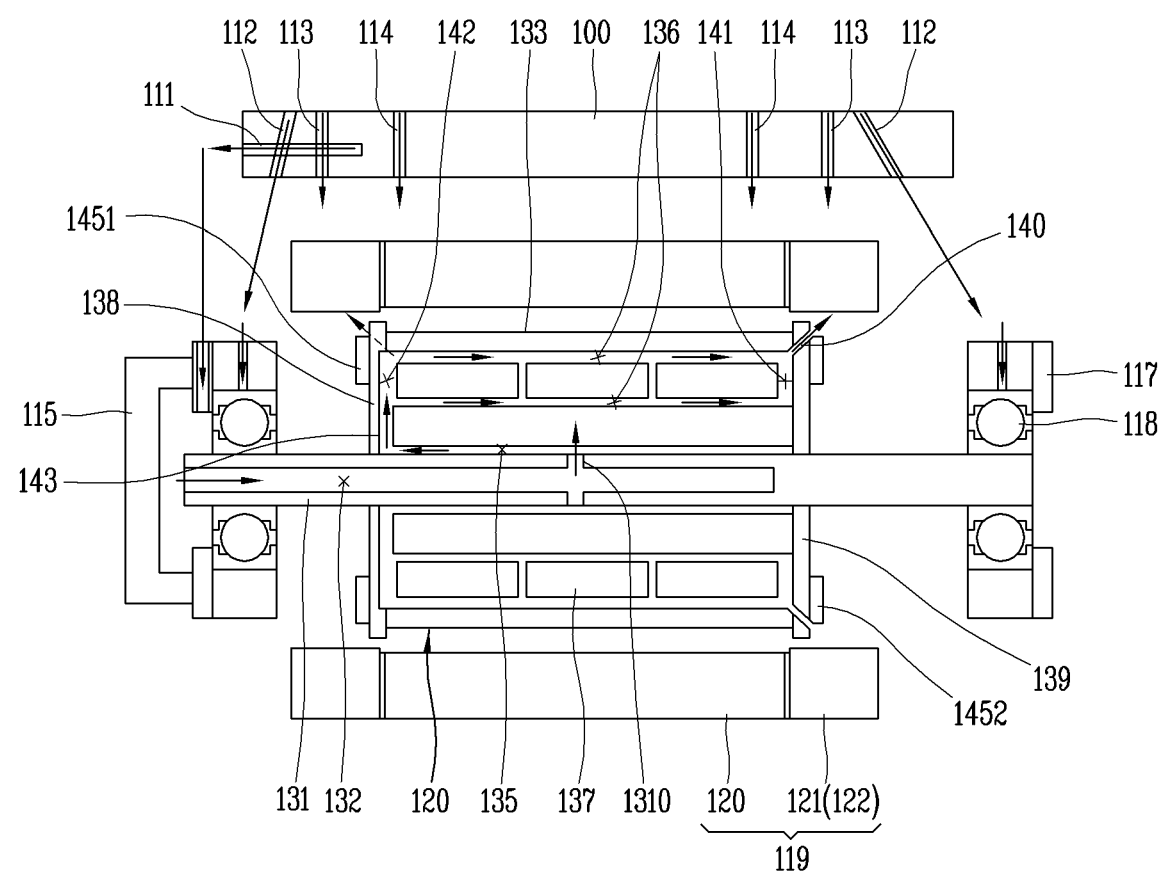
FIG. 8 is a conceptual view illustrating an example of a movement path of oil.

FIG. 2 is a cross-sectional view illustrating an internal structure of an example electric motor, FIG. 3 is a conceptual view illustrating an example rotor 130 of FIG. 2, and FIG. 4 is a conceptual view illustrating example end rings mounted to both ends of a rotor core 133 in FIG. 3. FIG. 5 is a conceptual view illustrating an example structure in which a plurality of injection fluid channels 141 and a plurality of return fluid channels 142 are alternately defined through each end ring in FIG. 4, FIG. 6 is a cross-sectional view taken along the line VI-VI of FIG. 3, FIG. 7 is a cross-sectional view taken along the line VII-VII of FIG. 6, and FIG. 8 is a conceptual view illustrating an example of a movement path of oil in accordance with the present disclosure.

In some implementations, an electric motor can include a housing 100, a housing cover, a stator 119, and a rotor 130.

The housing 100 can have a cylindrical shape. An accommodation space can be defined inside the housing 100. The stator 119 and the rotor 130 can be accommodated in the housing 100.

The housing cover can be provided on both ends of the housing 100 in a lengthwise direction to cover both end portions of the housing 100. The housing cover can include a first housing cover 115 disposed on one end of the housing 100 and a second housing cover 117 disposed on another end of the housing 100.

A cooling fluid channel 110 in which a cooling fluid such as oil flows can be defined in the housing 100. An inlet can be defined through an upper portion of the housing 100, so that the cooling fluid can be injected into the housing 100.

A plurality of spray nozzles (or injection nozzles) can be defined through the inside of the housing 100 in a thickness direction.

The plurality of spray nozzles can be spaced apart from one another in a lengthwise direction of the housing 100. One side of each of the plurality of spray nozzles can communicate with the cooling fluid channel 110 and another side of each of the plurality of spray nozzles can communicate with the accommodation space of the housing 100.

The plurality of spray nozzles can be defined perpendicularly downward or can be inclined. Some of the plurality of spray nozzles can be defined horizontally.

First spray nozzles 111 defined horizontally among the plurality of spray nozzles can spray oil into the accommodation space toward the first housing cover 115, and second spray nozzles 112 defined to be inclined among the plurality of spray nozzles can spray oil into the accommodation space toward a bearing 118.

Third spray nozzles 113 defined perpendicularly downward among the plurality of spray nozzles can spray oil into the accommodation space toward an outer circumferential portion of an end turn 122 of the stator coil 121, and fourth spray nozzles 114 defined perpendicularly downward among the plurality of spray nozzles can spray oil into the accommodation space toward the stator core 120.

With this configuration, a cooling fluid such as oil can be sprayed onto the stator coil 121, the stator core 120, and the bearing 118 to cool the stator coil 121, the stator core 120, and the bearing 118.

A cover fluid channel 116 can be defined in the first housing cover 115. One side of the cover fluid channel 116 can communicate with an accommodation hole in which oil sprayed from the first spray nozzles 111, and a middle portion of the cover fluid channel 116 can communicate with an inside of one end portion of the rotary shaft 131.

With this configuration, the oil injected from the first spray nozzles 111 can be sprayed into the cover fluid channel 116 through the accommodation hole, and the oil flowing along the cover fluid channel 116 can flow into the one end portion of the rotary shaft 131.

The stator 119 can include a stator core 120 and a stator coil 121. The stator core 120 can include a plurality of electrical steel sheets that are stacked. A rotor accommodation hole for accommodating the rotor 130 can be defined in a radial center of the stator core 120.

A plurality of slots and a plurality of teeth can be alternately disposed at an inner side of the stator core 12 in a circumferential direction. The plurality of slots can be defined through the stator core 120 in an axial direction.

The stator coil 121 can be configured as a hairpin type. The plurality of stator coils 121 can be wound around the stator core 120 through the plurality of slots. End turns 122 that protrude from the slots to the outside of the stator core 120 can be disposed at both end portions of the stator coil 121, respectively.

The end turns 122 can be bent from the stator coil 121 at a preset angle and extend to an opposite side in a lengthwise direction of the stator core 120.

The rotor 130 can include a rotary shaft 131, a rotor core 133, permanent magnets 137, and end rings.

The rotary shaft 131 can have a first fluid channel 132 therein, such that a cooling fluid flows along the first fluid channel 132. The first fluid channel 132 can extend in the axial direction. A plurality of communication holes 1310 can be defined through one side of the rotary shaft 131 in the radial direction.

The plurality of communication holes 1310 can be configured to transfer the cooling fluid flowing along the first fluid channel 132 into the rotor core 133. The plurality of communication holes 1310 can be disposed on the rotary shaft 131 to be spaced apart from one another in the circumferential direction. The plurality of communication holes 1310 can be disposed on a central portion of the rotary shaft 131 in a lengthwise direction of the rotary shaft 131.

The rotor core 133 can be mounted to the rotary shaft 131 to be rotatable together with the rotary shaft 131. The rotor core 133 can have a cylindrical shape. The rotor core 133 can include a plurality of electrical steel sheets that are stacked.

A rotary shaft accommodation hole for accommodating the rotary shaft 131 can be defined through the center of the rotor core 133 in the axial direction.

A plurality of permanent magnet accommodation holes for accommodating a plurality of permanent magnets 137 can be defined in the rotor core 133.

A plurality of axial fluid channels 135 and a plurality of second fluid channels 136 through which the cooling fluid flows can be defined in the rotor core 133.

The plurality of axial fluid channels 135 can be defined in an inner end portion of the rotor core 133 in the radial direction. The plurality of axial fluid channels 135 can be spaced apart from one another in the circumferential direction. Each of the plurality of axial fluid channels 135 can extend along the axial direction of the rotor core 133.

The plurality of axial fluid channels 135 can communicate with the plurality of communication holes 1310, such that the cooling fluid can move from the rotary shaft 131 to the rotor core 133 through the plurality of communication holes 1310. Accordingly, the cooling fluid can directly cool down the rotor core 133 through heat exchange with the rotor core 133.

The plurality of second fluid channels 136 can surround the permanent magnets 137 such that the cooling fluid can be brought into contact with at least parts or portions of the permanent magnets 137 so as to cool down the permanent magnets 137 through heat conduction from the permanent magnets 137.

The plurality of second fluid channels 136 can be defined in an outer end portion of the rotor core 133 in the radial direction. The plurality of second fluid channels 136 can be spaced apart from one another in the circumferential direction. Each of the plurality of second fluid channels 136 can extend in a lengthwise direction of the rotor core 133.

The plurality of second fluid channels 136 can be parallel to the plurality of axial fluid channels 135. However, the plurality of second fluid channels 136 can be connected respectively to the plurality of axial fluid channels 135 by inner fluid channels defined in an inner surface of the end ring. The plurality of second fluid channels 136 can be arranged in parallel, for example, in two rows.

With this configuration, the cooling fluid can flow from the axial fluid channels 135 into the second fluid channels 136 to be brought into contact with the permanent magnets 137, thereby cooling down the permanent magnets 137 through heat exchange with the permanent magnets 137.

The end rings can be coupled to cover both ends of the rotor core 133, and can be mounted to the rotary shaft 131 to be rotatable together with the rotary shaft 131. A rotary shaft accommodation hole can be defined through a center of each end ring.

A plurality of spray holes (or injection holes) 140 can be defined through an outer circumferential portion of the end ring in a thickness direction. Each of the plurality of spray holes 140 can communicate with the plurality of second fluid channels 136. The plurality of spray holes 140 can be spaced apart from one another in a circumferential direction of the end ring.

With this configuration, the cooling fluid can be sprayed from the rotor core 133 into the accommodation space of the housing 100 through the plurality of spray holes 140.

Each of the plurality of spray holes 140 can be disposed at an inner side of the outer circumferential portion of each end ring to be inclined toward an inner circumferential surface of the end turn 122 of the stator coil 121.

With this configuration, the cooling fluid can be sprayed on the inner circumferential surface of the end turn 122 of the stator coil 121 through the plurality of spray holes 140. Accordingly, a contact area of the stator coil 121 with the cooling fluid can be further expanded to the inner circumferential surface as well as the outer circumferential surface of the end turn 122, thereby further improving the cooling performance by taking more heat from the stator coil 121.

A plurality of rotary fins 145 can protrude from an outer surface of each end ring in the axial direction, so as to rotate air around the end ring. Each of the plurality of rotary fins 145 can rotate together with the rotor core 133 centering on the rotary shaft 131.

Each of the plurality of rotary fins 145 can be disposed to be spaced apart from one another in the circumferential direction. Each of the plurality of rotary fins 145 can have a curved shape. Each of the plurality of rotary fins 145 can have an arcuate shape. The plurality of rotary fins 145 can be bent in the same direction as a rotating direction of the rotor core 133.

Outer end portions of the rotary fins 145 in the radial direction can be disposed adjacent to an outer circumferential portion of the end ring, and inner end portions of the rotary fins 145 can be disposed adjacent to the rotary shaft accommodation hole of the end ring. An interval between the outer end portions of the plurality of rotary fins 145 adjacent to each other in the circumferential direction can be wider than an interval between the inner end portions of the plurality of rotary fins 145 adjacent to each other in the circumferential direction.

With this configuration, the outer end portions of the rotary fins 145 can be disposed adjacent to the spray holes 140, such that air around an outer side of the spray holes 140 can be quickly moved. Accordingly, pressure can be lowered at the outer side of the spray holes 140, which can facilitate circulation of the cooling fluid.

For example, when the pressure at the outer side of the spray holes 140 is lowered, internal pressure of the rotor core 133 can be relatively increased, which can facilitate the cooling fluid to be sprayed from the inside of the rotor core 133 through the spray holes 140.

A plurality of injection fluid channels 141 and a plurality of return fluid channels 142 can be disposed in an inner surface of each end ring.

The plurality of injection fluid channels 141 and the plurality of return fluid channels 142 can be alternately spaced apart from each other in the circumferential direction of the end ring. Each of the plurality of injection fluid channels 141 and the plurality of return fluid channels 142 can be recessed in the inner surface of each end ring in the thickness direction.

The plurality of injection fluid channels 141 and the plurality of return fluid channels 142 can be defined to correspond to an arrangement shape of the permanent magnets 137.

For example, the plurality of permanent magnets 137 can have a plate shape and can be arranged in an inverted triangle shape.

The plurality of injection fluid channels 141 and the plurality of return fluid channels 142 can be defined in an inverted triangular shape.

The plurality of injection fluid channels 141 can communicate with the plurality of spray holes 140, respectively. Each of the plurality of injection fluid channels 141 can be configured to connect the second fluid channel 136 and the spray hole 140. The plurality of spray holes 140 can be disposed on an outer surface of each of the plurality of injection fluid channels 141 to be spaced apart from each other in the circumferential direction.

With this configuration, the plurality of injection fluid channels 141 can temporarily collect and store the cooling fluid delivered from the second fluid channels 136 and distribute the cooling fluid into the plurality of spray holes 140. The distributed cooling fluid can then be sprayed onto the end turn 122 through the plurality of spray holes 140.

The plurality of return fluid channels 142 can change a flowing direction of the cooling fluid transferred from the axial fluid channels 135 to return to the second fluid channels 136.

Each of the plurality of return fluid channels 142 can be provided with a connection fluid channel 143 at an inner side of the end ring in the radial direction. One side of the connection fluid channel 143 can communicate with the second fluid channel 136 and another side of the connection fluid channel 143 can communicate with the axial fluid channel 135, such that the second fluid channel 136 and the axial fluid channel 135 can be connected to each other.

The rotor core 133 can include a plurality of weight-reducing holes 134 disposed between the permanent magnet accommodation holes and the rotary shaft accommodation hole. The plurality of weight-reducing holes 134 can extend along the lengthwise direction of the rotor core 133. The plurality of weight-reducing holes 134 can be spaced apart from the permanent magnet accommodation holes with a preset phase difference 8 in the circumferential direction.

A plurality of weight-reducing grooves 144 can be defined at the inner surface of each end ring. The plurality of weight-reducing grooves 144 can have a shape corresponding to the plurality of weight-reducing holes 134 so as to communicate with the plurality of weight-reducing holes 134 in an overlapping manner along the axial direction.

The connection fluid channel 143 can communicate with the weight-reducing groove 144. One side of the connection fluid channel 143 can connect the second fluid channel 136 and the weight-reducing groove 144, and another side of the connection fluid channel 143 can connect the weight-reducing groove 144 and the axial fluid channel 135.

With this configuration, the plurality of injection fluid channels 141 and the plurality of return fluid channels 142 can be alternately arranged in the circumferential direction, so that the cooling fluid can be transferred from the rotary shaft 131 to the rotor core 133 through a single-pass structure.

For example, the single-pass structure means that the cooling fluid passes only once along the same path (or direction) through the axial fluid channels 135 and the second fluid channels 136, which are the inner fluid channels of the rotor core 133, from the rotary shaft 131.

Hereinafter, the single-pass structure of the rotor core 133 and the end ring will be described with reference to FIG. 8.

Front and rear end portions of the rotary shaft 131 can be rotatably supported by bearings 118. The bearings 118 can be mounted to the first housing cover 115 and the second housing cover 117. A sealing cover can be mounted on the first housing cover 115, to seal a gap between the first housing cover 115 and the first fluid channel 132 of the rotary shaft 131.

The end rings can include a first end ring 138 disposed on one end of the rotor core 133 facing the first housing cover 115 in the axial direction, and a second end ring 139 disposed on another end of the rotor core 133 facing the second housing cover 117 in the axial direction.

In order to implement the single-pass structure, the first end ring 138 and the second end ring 139 can be asymmetric to each other.

An outer surface of the first end ring 138 and an outer surface of the second end ring 139 can be disposed to face opposite directions. First rotary fins 1451 disposed on the outer surface of the first end ring 138 and second rotary fins 1452 disposed on the outer surface of the second end ring 139 can be curved in the same direction as the rotating direction of the rotor core 133.

For example, when the first end ring 138 is viewed from the first housing cover 115 in the axial direction, the first rotary fins 1451 can be curved clockwise and rightward from inside to outside in the radial direction. When the second end ring 139 is viewed from the second housing cover 117 in the axial direction, the second rotary fins 1452 can be curved counterclockwise and leftward from the inside to the outside in the radial direction.

The plurality of injection fluid channels 141 and the plurality of return fluid channels 142 defined in the inner surface of the first end ring 138 and the plurality of injection fluid channels 141 and the plurality of return fluid channels 142 defined in the inner surface of the second end ring 139 can be disposed in an alternating manner in the axial direction with a preset phase difference in the circumferential direction.

That is, the injection fluid channel 141 of the first end ring 138 and the return fluid channel 142 of the second end ring 139 can be disposed to face each other in the axial direction, and the injection fluid channel 141 of the first end ring 138 and the injection fluid channel 141 of the second end ring 139 can be alternately arranged in the axial direction.

Hereinafter, a movement path of a cooling fluid will be described.

An inlet can be defined from one end portion of the rotary shaft 131 to be opened. Accordingly, a cooling fluid such as oil can be introduced into the first fluid channel 132 through the inlet of the rotary shaft 131. The cooling fluid can be air.

The cooling fluid can cool the rotary shaft 131 through heat exchange with the rotary shaft 131 while flowing along the first fluid channel 132 of the rotary shaft 131.

The cooling fluid can be delivered to the rotor core 133 through the communication hole 1310 connecting the rotary shaft 131 and the rotor core 133. At this time, the number of paths along which the cooling fluid is transferred from the rotary shaft 131 to the rotor core 133 can be the same as the number of poles of the electric motor.

For example, in some implementations, the electric motor can have 6 poles, and six paths of the cooling fluid transmitted from the rotary shaft 131 to the rotor core 133 through the communication holes 1310 can be defined.

The cooling fluid can be introduced into the first end ring 138 along the axial fluid channels 135 extending toward the first end ring 138 in the axial direction.

The connection fluid channels 143 connecting the first end ring 138 and the rotor core 133 can be defined in the inner surface of the first end ring 138 and extend radially to communicate with the axial fluid channels 135. The cooling fluid can be introduced into the weight-reducing grooves 144 through the connection fluid channels 143 via the axial fluid channels 135, temporarily stay in the weight-reducing grooves 144, and then flow to the return fluid channels 142 through the connection fluid channels 143 again.

The return fluid channels 142 can communicate with the second fluid channels 136 and switch a flowing direction of the cooling fluid such that the cooling fluid can flow from the first end ring 138 to the second end ring 139 in the axial direction.

The second fluid channels 136 can communicate with the permanent magnet accommodation holes. The second fluid channels 136 can be arranged in parallel in two rows at an outer side and an inner side of the rotor core 133 in the radial direction of the rotor core 133.

The cooling fluid can be introduced into the permanent magnet accommodation holes while flowing along the second fluid channels 136, so as to cool down the permanent magnets 137 through heat exchange with the permanent magnets 137.

The cooling fluid can flow onto an inner surface of the second end ring 139 through the injection fluid channel 141 that connects the rotor core 133 and the second end ring 139 and faces the return fluid channel 142 of the first end ring 138 in the axial direction.

The cooling fluid can be sprayed from the second end ring 139 into the accommodation space of the housing 100 through the plurality of spray holes 140 defined through the injection fluid channel 141. At this time, the cooling fluid can be sprayed onto an inner circumferential surface of the end turn 122 through the plurality of spray holes 140, thereby cooling down the stator coil 121 through heat exchange with the end turn 122.

The cooling fluid sprayed from the second end ring 139 can flow back into the rotary shaft 131 and circulate.

Here, the cooling fluid can be transferred from the rotary shaft 131 to the rotor core 133. The cooling fluid inside the rotor core 133 can flow in the same single direction, that is, from the first end ring 138 to the second end ring 139 along the second fluid channels 136, and be sprayed onto the inner circumferential surface of the end turn 122, which protrudes from one end portion of the stator core 120 in the lengthwise direction, through the spray holes 140 of the second end ring 139. Thus, the cooling fluid can flow through a single-pass structure.

When the number of poles of the electric motor is 6, the number of paths that the cooling fluid is transmitted from the rotary shaft 131 to the rotor core 133 can be 6 paths, and the cooling fluid can radially move in the rotor core 133 independently for each polarity and move in a single pass for each polarity.

However, a moving direction of the cooling fluid in the rotor core 133 can change from the first end ring 138 to the second end ring 139 or from the second end ring 139 to the first end ring 138 in an alternating manner whenever a position changes to an adjacent polarity in a circumferential direction.

Therefore, in some implementations, the plurality of rotary fins 145 can protrude from the outer surface of each end ring to be curved in the circumferential direction. As the plurality of rotary fins 145 rotate together with the rotor core 133, air around the spray holes 140 of the end ring can flow fast to cause a pressure drop. Accordingly, the cooling fluid can flow from the first fluid channel 132 of the rotary shaft 131 to the axial fluid channels 135 and the second fluid channels 136 of the rotor core 133 so as to be sprayed onto the inner circumferential surface of the end turn 122 of the stator 119 through the plurality of spray holes 140.

As the plurality of rotary fins 145 provide circulating power to the cooling fluid, the cooling fluid can move from the first fluid channel 132 of the rotary shaft 131 to the axial fluid channels 135 and the second fluid channels 136 of the rotor core 133, so as to easily circulate from the spray holes 140 of the end ring back to the first fluid channel 132 of the rotary shaft 131, thereby increasing a circulation flow rate of the cooling fluid.

In some examples, since a rotation speed of the plurality of rotary fins 145 increases according to the rotation of the rotor core 133, a flow rate of the cooling fluid flowing into the rotary shaft 131 can increase.

In addition, since the plurality of rotary fins 145 are disposed on each of the first end ring 138 and the second end ring 139 to be curved in the same direction as the rotating direction of the rotor core 133, circulating power of the cooling fluid can be further doubled.

Further, as the paths along which the cooling fluid is transmitted from the rotary shaft 131 to the rotor core 133 are independently defined in the same number as the number of poles, the cooling fluid can flow to each of the plurality of permanent magnets 137, so as to uniformly cool down the permanent magnets 137 for each polarity.

Furthermore, the plurality of injection fluid channels 141 and the plurality of return fluid channels 142 are alternately disposed in the inner surface of the end ring to be spaced apart from each other in the circumferential direction, and the cooling fluid in the rotor core 133 can move in the same single direction along the axial fluid channels 135 and the second fluid channels 136 so as to implement the single-pass structure. Accordingly, the flow rate and the circulation flow rate of the cooling fluid can increase, thereby improving cooling performance of the rotor 130 and the stator 119.

Figure 9:
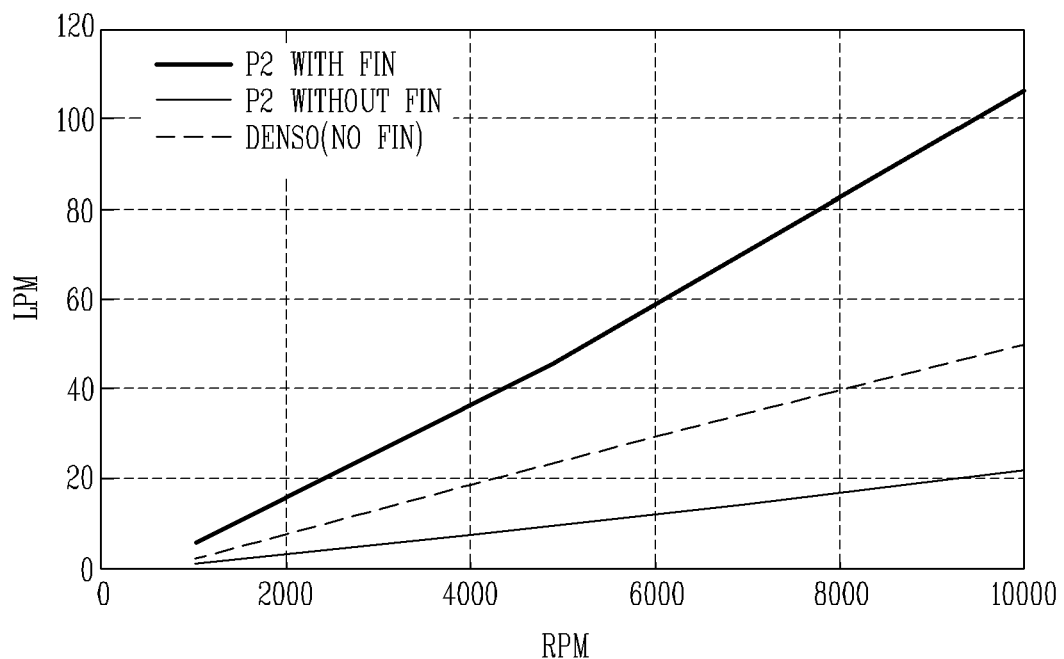
FIG. 9 shows a graph and a table comparing example flow rates of a cooling fluid into an inlet of a rotary shaft of an example electric motor with rotary fins and an electric motor without rotary fins.

FIG. 9 shows a graph and a table comparing example flow rates of a cooling fluid into the inlet of the rotary shaft of an electric motor with rotary fins and an electric motor without rotary fins.

For example, an electric motor of the present disclosure with the rotary fins 145 can have a cooling flow rate of 5.71 LPM at 1000 rpm and the cooling fluid is introduced into the inlet of the rotary shaft 131. An electric motor 1 without the rotary fins 145 has a cooling flow rate of 1.25 LPM at 1000 rpm, and an electric motor of DENSO Cooperation without the rotary fins 145 has a cooling flow rate of 2.35 LPM at 1000 rpm.

The electric motor of the present disclosure with the rotary fins 145 can have a cooling flow rate of 46.95 LPM at 5000 rpm and the cooling fluid is introduced into the inlet of the rotary shaft 131. The electric motor 1 without the rotary fins 145 has a cooling flow rate of 9.82 LPM at 5000 rpm, and the electric motor of DENSO Cooperation without the rotary fins 145 has a cooling flow rate of 24.37 LPM at 5000 rpm.

The electric motor of the present disclosure with the rotary fins 145 can have a cooling flow rate of 106.33 LPM at 10000 rpm and the cooling fluid is introduced into the inlet of the rotary shaft 131. The electric motor 1 without the rotary fins 145 has a cooling flow rate of 21.99 LPM at 10000 rpm, and the electric motor of DENSO Corporation without the rotary fins 145 has a cooling flow rate of 49.97 LPM at 10000 rpm.

In some cases, the cooling flow rate of the electric motor 1 without the rotary fins 145 can be less than even 20% of that of the electric motor according to the present disclosure with the rotary fins 145, and the electric motor of DENSO Corporation without the rotary fins 145 can be less than even 50% of that of the electric motor according to the present disclosure. The electric motor according to the present disclosure with the rotary fins 145 can provide remarkable effects compared to the electric motors of the related art.

Figure 10:
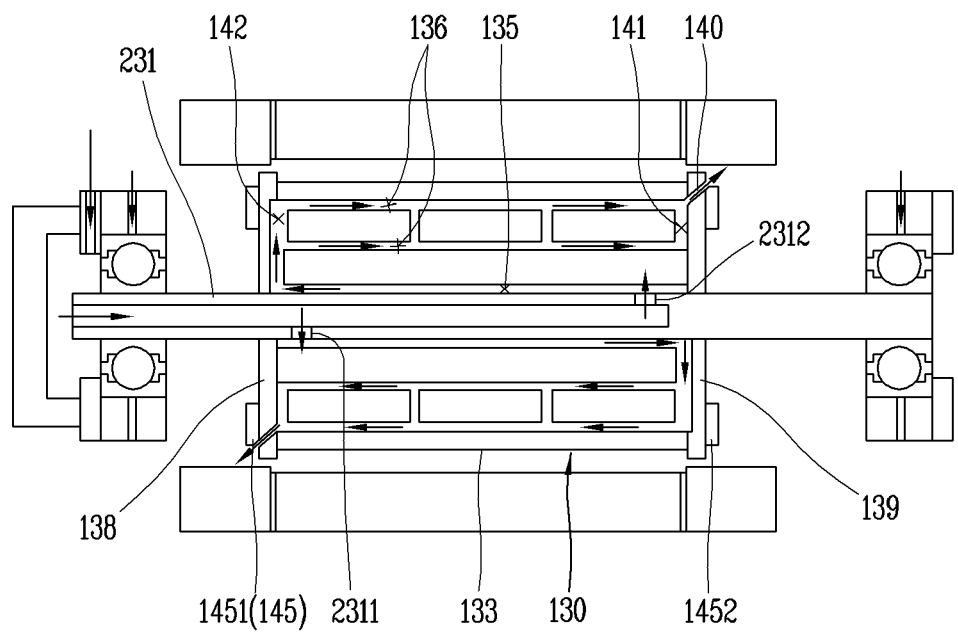
FIG. 10 is a conceptual view illustrating another example of a movement path of oil.
Figure 11:
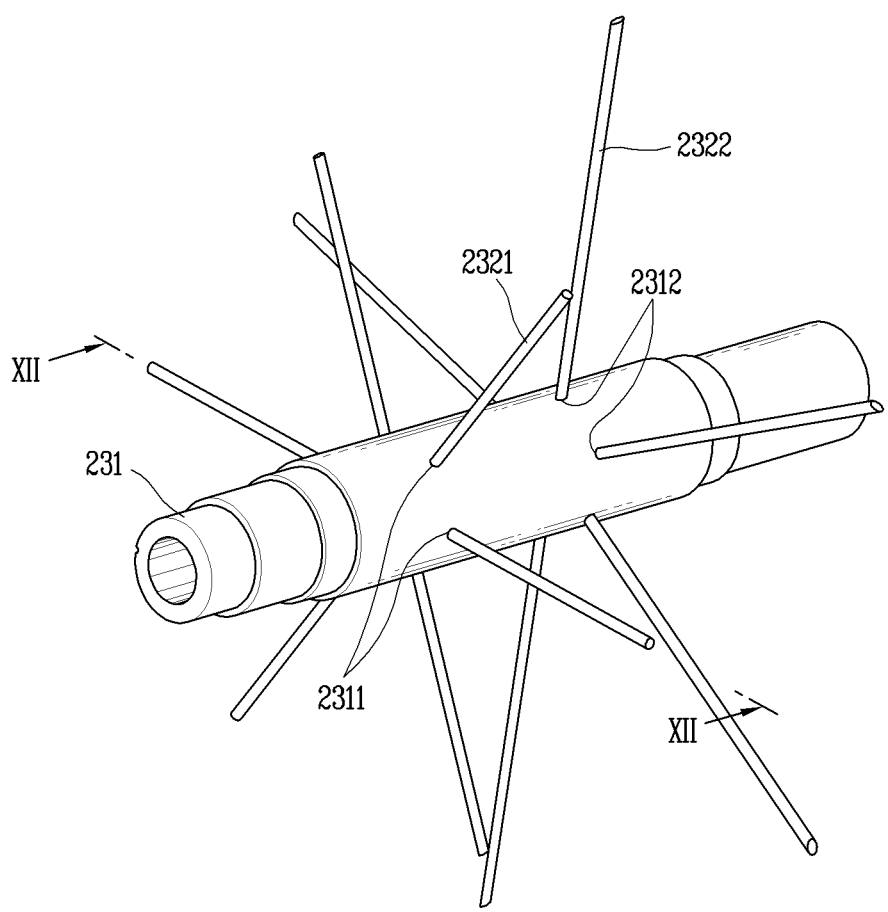
FIG. 11 is a conceptual view illustrating an example of first and second paths of a cooling fluid transferred from a rotary shaft to a rotor core of FIG. 2.
Figure 12:
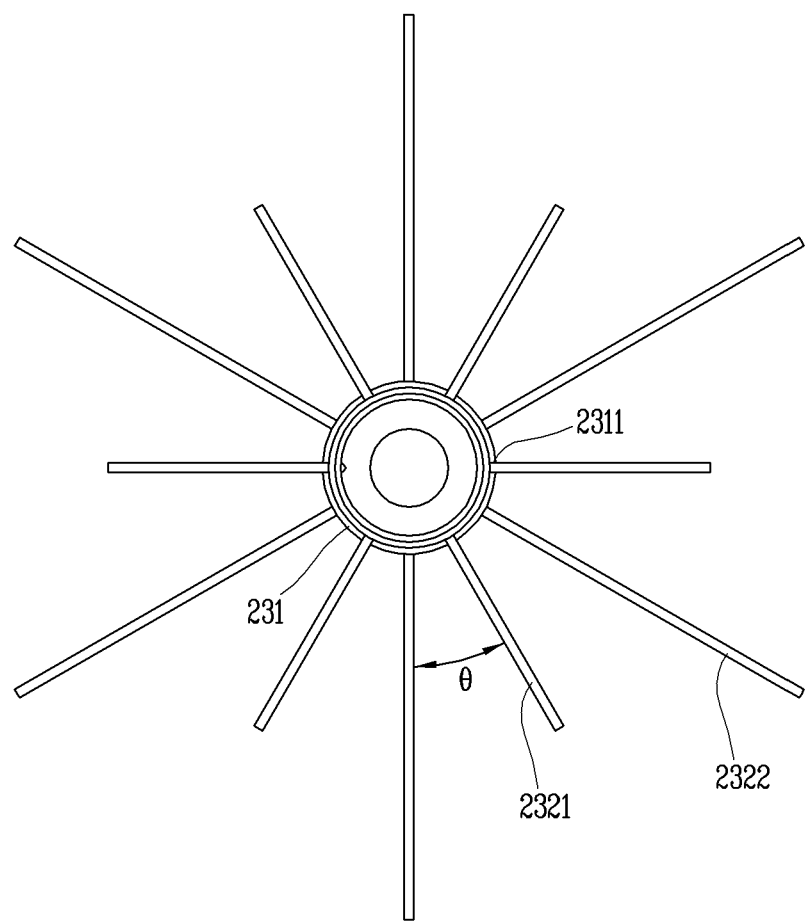
FIG. 12 is a conceptual view taken along the line XII-XII in FIG. 11 illustrating an example structure in which first and second paths of a cooling fluid transferred in both directions from the rotary shaft to the rotor core, respectively, are defined with a phase difference from each other in a circumferential direction.

FIG. 10 is a conceptual view illustrating an example of a movement path of oil in accordance with another implementation of the present disclosure, FIG. 11 is a conceptual view illustrating an example of first and second paths of a cooling fluid transferred from a rotary shaft to a rotor core of FIG. 2, and FIG. 12 is a conceptual view taken along the line XII-XII in FIG. 11, which illustrates an example structure in which first and second paths of a cooling fluid transferred in both directions from the rotary shaft to the rotor core, respectively, are defined with a phase difference from each other in a circumferential direction.

In some implementations, a plurality of communication holes 2311 and 2312 can be defined through a rotary shaft 231 in a spaced manner. This implementation can be different from the foregoing implementation illustrated in FIGS. 1 to 9 in that a cooling fluid transferred from the rotary shaft 231 to a rotor core through the plurality of communication holes flows axially in both directions opposite to each other.

The plurality of communication holes 2311 and 2312 can include a plurality of first communication holes 2311 and a plurality of second communication holes 2312. The first communication holes 2311 and the second communication holes 2312 can be spaced apart from each other in the axial direction.

The plurality of first communication holes 2311 can be disposed adjacent to a first end ring, and the plurality of second communication holes 2312 can be disposed adjacent to a second end ring.

The plurality of first communication holes 2311 and the plurality of second communication holes 2312 can be spaced apart from each other at equal intervals in a circumferential direction of the rotary shaft 231.

The plurality of first communication holes 2311 and the plurality of second communication holes 2312 can be alternately disposed in the axial direction with a preset phase difference in the circumferential direction of the rotary shaft 231.

A first path 2321 of a cooling fluid transmitted from the rotary shaft 231 to the rotor core through the plurality of first communication holes 2311 and a second path 2322 of a cooling fluid transmitted from the rotary shaft 231 to the rotor core through the plurality of second communication holes 2312 can be provided in the same number as the number of poles/2.

The first paths 2321 and the second path 2 2322 can be alternately disposed in the axial direction with a phase difference of 360 degrees/the number of poles.

Each of the first path 2321 and the second path 2322 has a single-pass fluid channel. For example, each of the first path 2321 and the second path 2322 can be a pipe or tube.

Since other components are the same as or similar to those in the foregoing implementation of FIGS. 1 to 9, a duplicated description will be omitted.

The invention claimed is:

1. A rotor comprising:
   a rotary shaft defining a first fluid channel configured to guide a cooling fluid;
   a rotor core that is configured to rotate about the rotary shaft and comprises a plurality of permanent magnets, the rotor core defining a plurality of second fluid channels that are in fluid communication with the first fluid channel and configured to cool the plurality of permanent magnets by the cooling fluid; and
   a plurality of end rings respectively disposed at end portions of the rotor core, the plurality of end rings defining a plurality of spray holes that are in fluid communication with the plurality of second fluid channels and configured to spray the cooling fluid to an outside of the rotor core,
   wherein each end ring among the plurality of end rings comprises a plurality of rotary fins that are disposed on an outer surface of the end ring and spaced apart from one another in a circumferential direction, the plurality of rotary fins being configured to circulate, to the first fluid channel, the cooling fluid sprayed through the plurality of spray holes,
   wherein the plurality of end rings comprise:
      a first end ring disposed at a first end portion of the rotor core, and
      a second end ring disposed at a second end portion of the rotor core, the second end portion being spaced apart from the first end portion in an axial direction of the rotary shaft,
   wherein the first end ring and the second end ring are asymmetric with each other,
   wherein each of the first end ring and the second end ring defines:
      a plurality of injection fluid channels that are disposed at an inner surface of one of the first end ring and the second end ring, the inner surface facing an end of the rotor core, the plurality of injection fluid channels being spaced apart from one another in the circumferential direction and in fluid communication with the plurality of spray holes; and
      a plurality of return fluid channels that are arranged alternately with the plurality of injection fluid channels in the circumferential direction, the plurality of return fluid channels being configured to transfer the cooling fluid from the rotor core toward another end of the rotor core in the axial direction, and
   wherein each of the plurality of injection fluid channels of the first end ring faces one of the plurality of return fluid channels of the second end ring in the axial direction.

2. The rotor of claim 1, wherein each of the plurality of rotary fins protrudes from the outer surface of the end ring in the axial direction of the rotary shaft and has a curved shape that is curved from an inner end portion of the end ring to an outer end portion of the end ring in a radial direction, the plurality of rotary fins being configured to cause air to rotate around the end ring.

3. The rotor of claim 1, wherein the first end ring comprises a plurality of first rotary fins, and the second end ring comprises a plurality of second rotary fins, and
   wherein the plurality of first rotary fins and the plurality of second rotary fins are curved in a rotating direction of the rotor core.

4. The rotor of claim 1, wherein the rotor core further defines a plurality of axial fluid channels that extend from a radially inner end portion of the rotor core, the plurality of axial fluid channels being connected to and in fluid communication with the first fluid channel, and
wherein each of the plurality of return fluid channels comprises a connection fluid channel that is connected to and in fluid communication with one of the plurality of axial fluid channels.

5. The rotor of claim 1, wherein the cooling fluid is oil.

6. The rotor of claim 1, wherein each of the plurality of spray holes is inclined with respect to the axial direction of the rotary shaft and extends toward an outside of one of the plurality of end rings.

7. The rotor of claim 1, wherein the rotor core and the plurality of permanent magnets are configured to be cooled by the cooling fluid moving from the first fluid channel to the plurality of second fluid channels, and
wherein the plurality of spray holes are configured to spray the cooling fluid to a stator coil disposed outside the rotor core to thereby cool the stator coil.

8. The rotor of claim 7, further comprising a plurality of paths configured to transfer the cooling fluid from the rotary shaft to the rotor core,
wherein a number of the plurality of paths is equal to a number of poles of the plurality of permanent magnets, and
wherein the rotary shaft further defines a plurality of communication holes connected to the rotor core, the plurality of communication holes being defined at a middle portion of the rotary shaft and extending in a radial direction of the rotary shaft.

9. The rotor of claim 7, further comprising a plurality of paths configured to transfer the cooling fluid from the rotary shaft to the rotor core,
wherein a number of the plurality of paths is a half of a number of poles of the plurality of permanent magnets, and
wherein the rotary shaft further defines a plurality of communication holes connected to the rotor core, the plurality of communication holes being defined through a first end portion and a second end portion of the rotary shaft and extending in a radial direction of the rotary shaft.

10. The rotor of claim 9, wherein the plurality of communication holes comprise:
a plurality of first communication holes defined through the first end portion of the rotary shaft; and
a plurality of second communication holes defined through the second end portion of the rotary shaft, and
wherein each of the plurality of first communication holes is spaced apart from one of the plurality of second communication holes in the circumferential direction by a preset angle.

11. An electric motor comprising:
a housing;
a stator disposed in the housing, the stator comprising a stator core and a stator coil that is wound around the stator core;
a rotor comprising a rotary shaft, a rotor core disposed in the stator and configured to rotate about the rotary shaft, and a plurality of permanent magnets disposed at the rotor core; and
a plurality of end rings respectively disposed at ends of the rotor core,
wherein the housing defines a plurality of spray nozzles therein, the plurality of spray nozzles being configured to spray a cooling fluid to the stator coil and the stator core,
wherein the rotor defines:
a first fluid channel inside the rotary shaft,
a plurality of second fluid channels inside the rotor core, the plurality of second fluid channel being in contact with the plurality of permanent magnets, and
a plurality of spray holes that are connected to and in fluid communication with the plurality of second fluid channels, the plurality of spray holes extending obliquely through an outer circumferential portion of one of the plurality of end rings and being configured to spray the cooling fluid to an end portion of the stator coil, and
wherein the first fluid channel, the plurality of second fluid channels, and the plurality of spray holes define a single-pass structure configured to guide the cooling fluid in a single direction,
wherein the rotary shaft further defines a plurality of communication holes that are connected to the rotor core and extend in a radial direction of the rotary shaft,
wherein the plurality of communication holes comprise:
a plurality of first communication holes defined at a first end portion of the rotary shaft, and
a plurality of second communication holes defined at a second end portion of the rotary shaft,
wherein each of the plurality of first communication holes is spaced apart from one of the plurality of second communication holes in a circumferential direction of the rotary shaft by a preset angle,
wherein the electric motor further comprises:
a plurality of first pipes that extend from the plurality of first communication holes to the rotor core, and
a plurality of second pipes that extend from the plurality of second communication holes to the rotor core, and
wherein a length of each of the plurality of first pipes is different from a length of each of the plurality of second pipes.

12. The electric motor of claim 11, wherein each end ring among the plurality of end rings comprises a plurality of rotary fins that protrude from an outer surface of the end ring and that have a curved shape, the plurality of rotary fins being configured to circulate, to the first fluid channel, the cooling fluid sprayed from the plurality of spray nozzles and the plurality of spray holes.

13. The electric motor of claim 11, wherein the plurality of end rings comprise a first end ring and a second end ring that are spaced apart from each other in the single direction.

14. The electric motor of claim 11, wherein the plurality of second fluid channels are spaced apart from one another and extend parallel to the single direction.

* * * * *